(12) United States Patent
Fields et al.

(10) Patent No.: US 6,757,724 B1
(45) Date of Patent: Jun. 29, 2004

(54) METHOD AND APPARATUS FOR CREATING AND DISPLAYING USER SPECIFIC AND SITE SPECIFIC GUIDANCE AND NAVIGATION INFORMATION

(75) Inventors: Duane Kimbell Fields, Austin, TX (US); Thomas Preston Gregg, Austin, TX (US); Sebastian Daniel Hassinger, Blanco, TX (US); William Walter Hurley, II, Austin, TX (US); Mark Andrew Kolb, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/492,436

(22) Filed: Jan. 27, 2000

(51) Int. Cl.[7] .............................................. G06F 15/173
(52) U.S. Cl. ...................... 709/223; 709/217; 709/218; 707/100
(58) Field of Search ................................. 709/202, 217, 709/223, 224, 218; 707/100, 10, 104.1; 714/47

(56) References Cited

U.S. PATENT DOCUMENTS

| | | | | |
|---|---|---|---|---|
| 5,812,769 A | * | 9/1998 | Graber et al. ................ | 709/228 |
| 5,974,572 A | * | 10/1999 | Weinberg et al. .............. | 714/47 |
| 6,035,330 A | * | 3/2000 | Astiz et al. .................. | 709/218 |
| 6,144,988 A | * | 11/2000 | Kappel ........................ | 709/202 |
| 6,282,548 B1 | * | 8/2001 | Burner et al. ............. | 707/104.1 |
| 6,356,903 B1 | * | 3/2002 | Baxter et al. ................. | 707/10 |
| 6,421,675 B1 | * | 7/2002 | Ryan et al. .................. | 707/100 |
| 6,434,565 B1 | * | 8/2002 | Berstis et al. ................ | 707/101 |
| 6,460,036 B1 | * | 10/2002 | Herz ........................... | 707/10 |
| 6,466,970 B1 | * | 10/2002 | Lee et al. .................... | 709/217 |
| 6,470,383 B1 | * | 10/2002 | Leshem et al. ............. | 709/223 |
| 6,633,316 B1 | * | 10/2003 | Maddalozzo et al. ....... | 345/854 |

* cited by examiner

*Primary Examiner*—David Wiley
*Assistant Examiner*—Phuoc H. Nguyen
(74) *Attorney, Agent, or Firm*—Duke W. Yee; Leslie A. Vanleeuwen; Wayne P. Bailey (57) ABSTRACT

A method and apparatus in a data processing system for generating suggested content for a site. A request is received for content for the site from a client, wherein the content is requested content. The requested content is sent to the client. The requested content includes information used to track user movement within the site. Suggested content is generated using the information in response to the client requesting the suggested content.

46 Claims, 8 Drawing Sheets

METHOD AND APPARATUS FOR CREATING AND DISPLAYING USER SPECIFIC AND SITE SPECIFIC GUIDANCE AND NAVIGATION INFORMATION

BACKGROUND OF THE INVENTION

1. Technical Field

The present invention relates generally to an improved data processing system and in particular to a method and apparatus for navigating a distributed data processing system. Still more particularly, the present invention provides a method and apparatus for providing guidance and navigation information for navigating sites in a distributed data processing system.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by a URL at the client machine. Retrieval of information on the Web is generally accomplished with an HTML-compatible browser. The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

When a user visits a Web site, the user will retrieve various pages from the site. Many times, the user will not look at the site in depth for the information that the user desires. Some Web sites will offer a site map that displays content within the site. These presently available site maps are based on the physical layout of the site. These site maps, however, often do not provide much more information to the user. Therefore, it would be advantageous to have an improved method and apparatus for providing navigation information to a user for use in navigating a Web site.

SUMMARY OF THE INVENTION

The present invention provides a method and apparatus in a data processing system for generating suggested content for a site. A request is received for content for the site from a client, wherein the content is requested content. The requested content is sent to the client. The requested content includes information used to track user movement within the site. Suggested content is generated using the information in response to the client requesting the suggested content

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
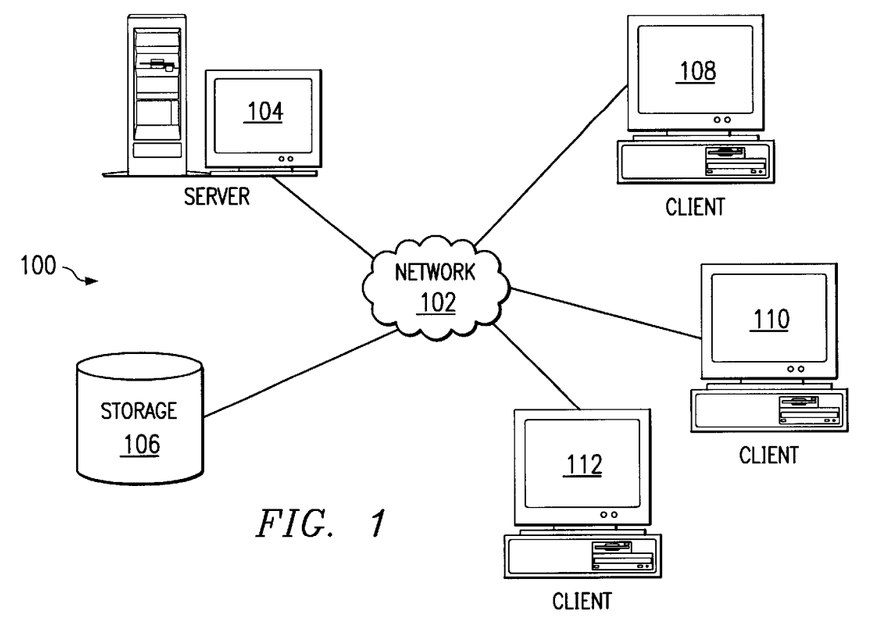
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
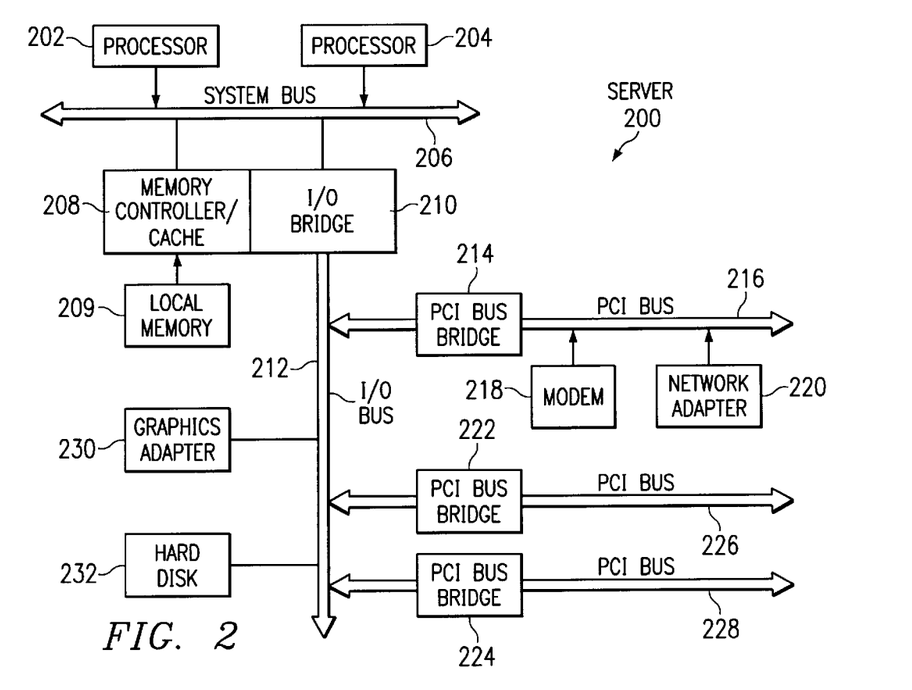
FIG. 2 is a block diagram depicting a data processing system that may be implemented as a server in accordance with a preferred embodiment of the present invention.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
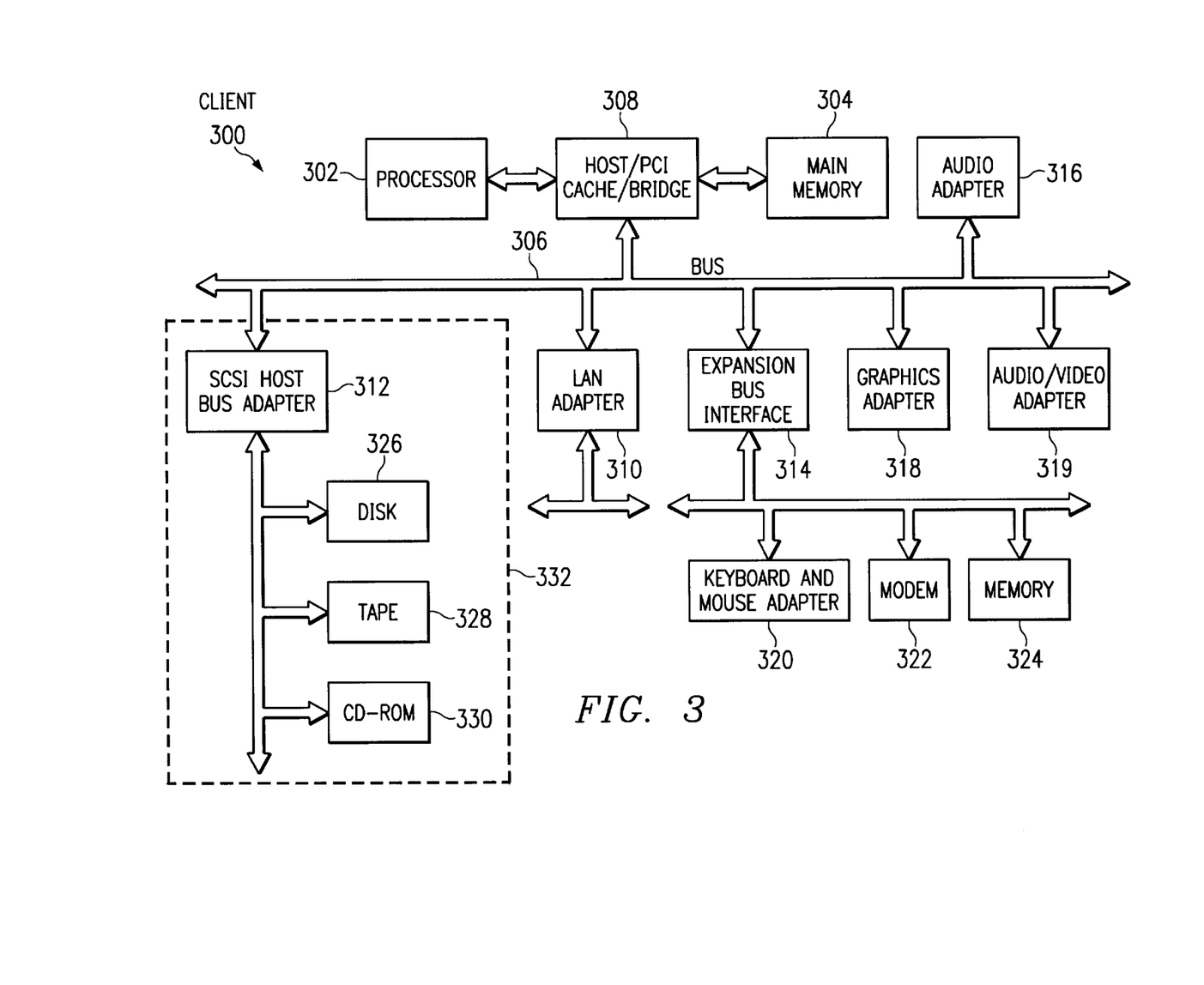
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture(ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer implemented instructions for creating and displaying user specific and site specific guidance and navigation information. The mechanism of the present invention provides a dynamic mechanism for navigating a Web site. The navigation is based on the page that the user is located on and pages previously visited. This navigation mechanism also may take into account other information, such as, for example, the user or the user's location. Pages that should be seen by the user are placed in a site map. The selection of the pages may be made using a number of mechanisms including a relevance ranking of the pages, as well as a policy for the particular site.

The mechanism of the present invention uses tags, such as HTML tags, or cookies to track pages seen by the user, information represented on the pages, as well as additional pages of information on the site relevant to the type of information requested by the user visiting the site. Using this information, a dynamically generated site map may be used to map out pages visited by the user, as well as pages that should be visited by the user based on the relevance of the information in the pages and/or the policy set forth by the manager of the site.

Figure 4:
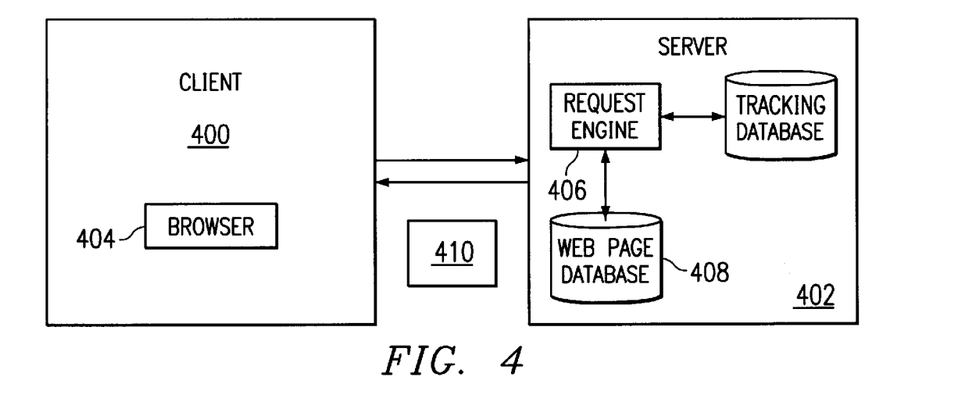
FIG. 4 is a block diagram illustrating components used to provide guidance and navigation information in accordance with a preferred embodiment of the present invention.

With reference now to FIG. 4, a block diagram illustrating components used to provide guidance and navigation information is depicted in accordance with a preferred embodiment of the present invention. In this example, a user at client 400 visits a Web site hosted by server 402. Requests for pages are sent from browser 404 in client 400 to request engine 406 in server 402. In response to receiving the request, the request engine will retrieve a static Web page or dynamically generate a Web page using information in Web page database 408. A Web page 410 is then returned to browser 404.

Further, request engine 406 also includes processes to track pages requested by the user and generate a site map for the particular user. This site map is dynamically generated in these examples and identifies pages seen by the user, as well as suggested pages for viewing by the user. The suggested pages are identified based on pages visited by the user at the site in these examples. In addition, request engine 406 also may take into account the identity of the user in identifying pages for inclusion in the site map. The identity of the user may include various information about the user, such as, for example, age, occupation, gender, and geographic location.

Figure 5:
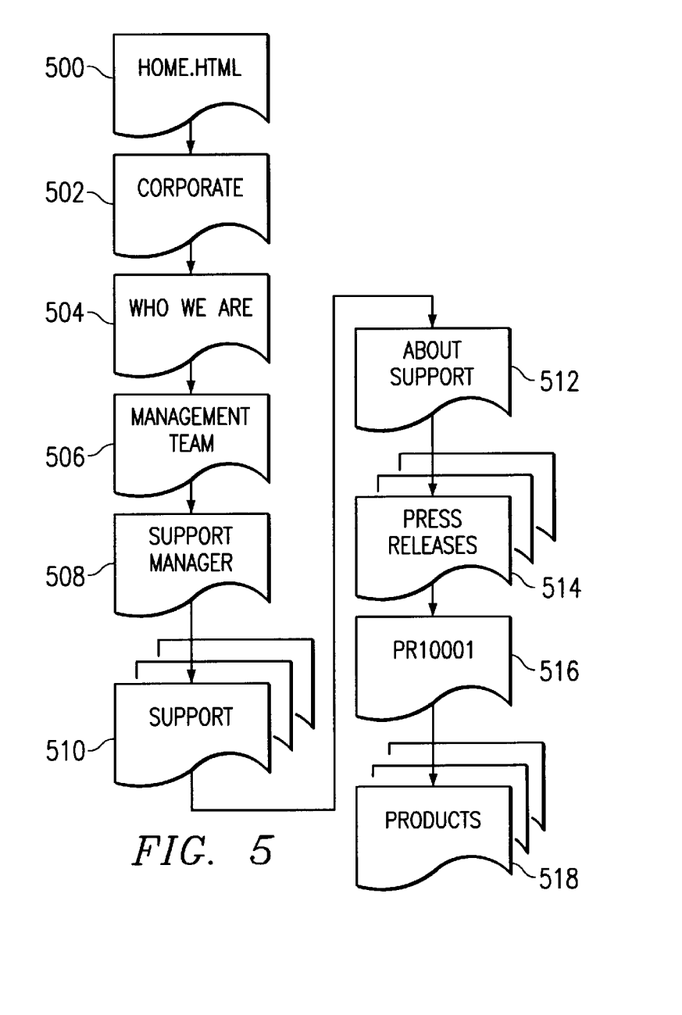
FIG. 5 is a diagram illustrating an example of pages visited by a user in accordance with a preferred embodiment of the present invention.

Turning next to FIG. 5, a diagram illustrating an example of pages visited by a user is depicted in accordance with a preferred embodiment of the present invention. In this example, home page 500 is a page first visited by a user. Corporate page 502 is a page visited by the user through a link located in home page 500. From corporate page 502, the user then visits "who we are" page 504, management team page 506, and support manager page 508. The user also visits support page 510, about support page 512 and press releases page 514. Next, pr1001 page 516 and then products page 518 are visited by the user. The mechanism of the present invention tracks these pages visited by the user. This information is used to generate navigation information for the user to visit other pages located at the site, which may not be quick or easy to find through normal navigation of pages, as illustrated in FIG. 5.

Figure 6A:
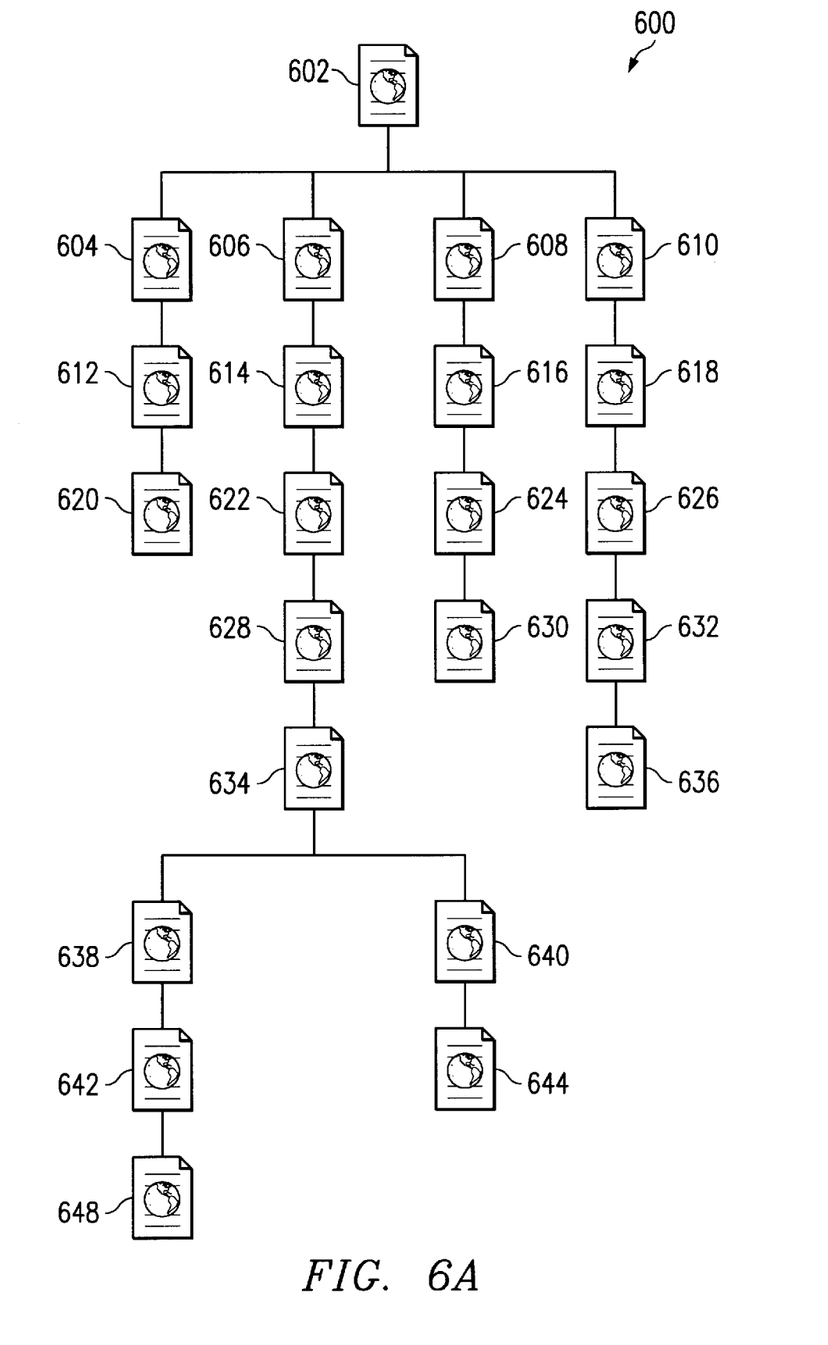
FIGS. 6A–6C are illustrations of site maps in accordance with a preferred embodiment of the present invention.
Figure 6B:
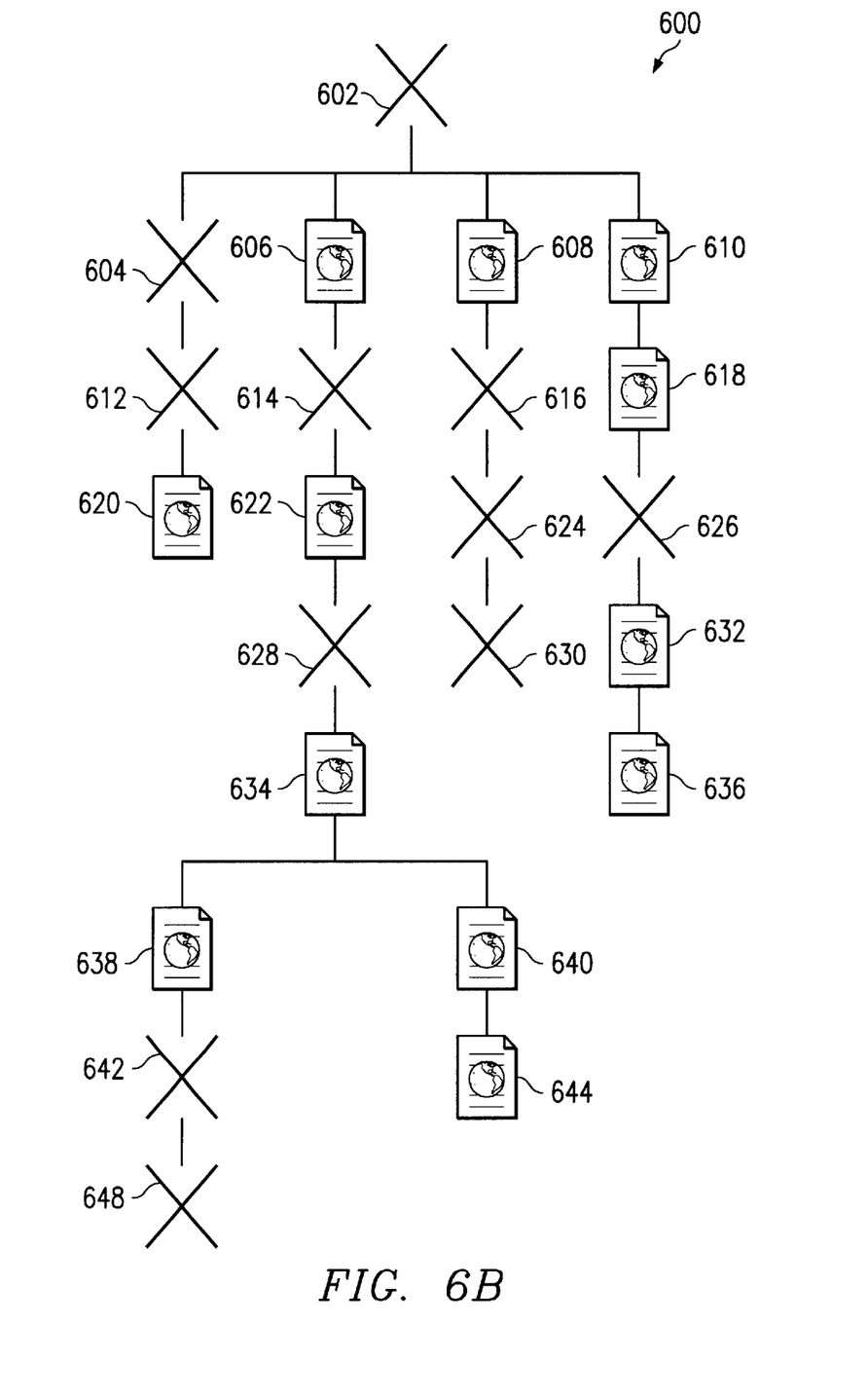
Figure 6C:
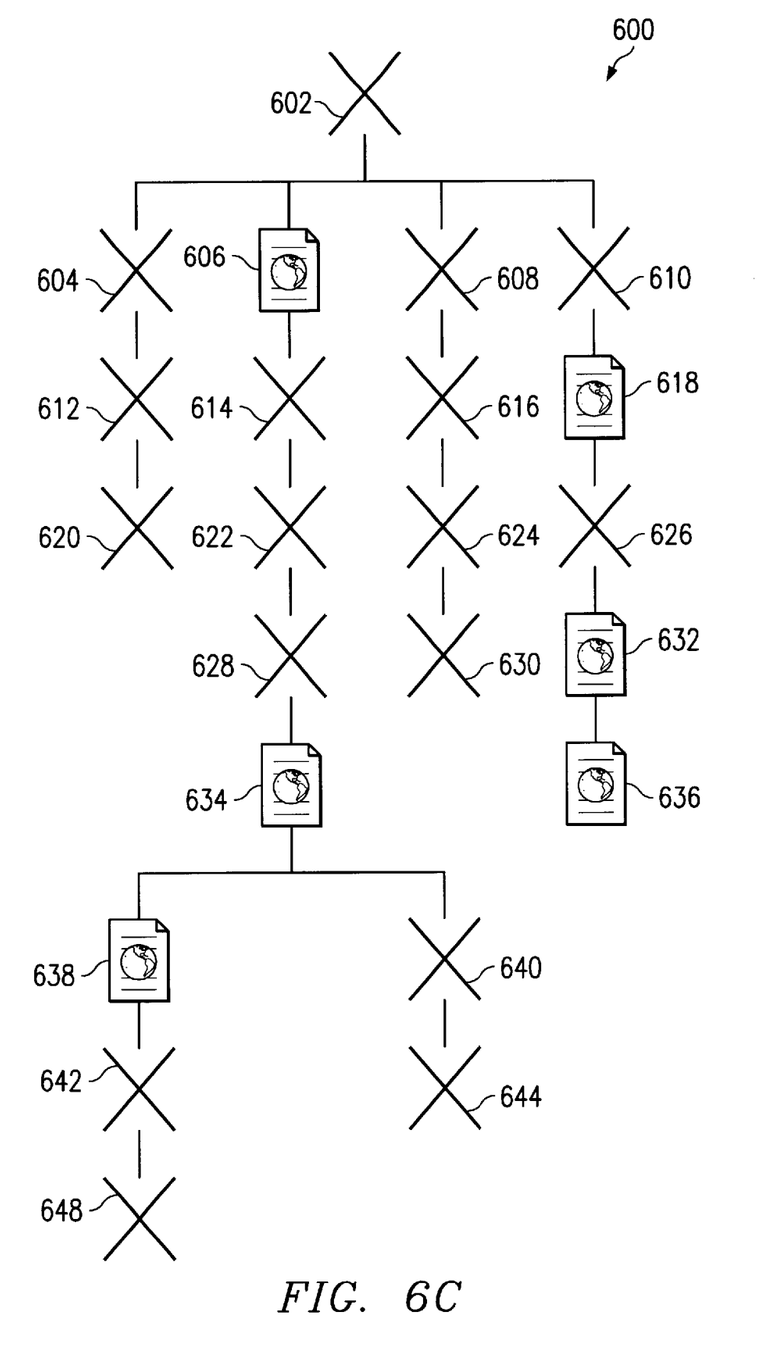

With reference now to FIGS. 6A–6C, illustrations of site maps are depicted in accordance with a preferred embodiment of the present invention. The site maps illustrated in these figures are dynamically generated and modified to provide guidance to the user. In these examples, pages seen, logical pages to visit, and peripherally related content may be graphically displayed to a user. Site map 600 in FIG. 6A illustrates a site map to the user upon entry of a site. This site map also may be generated in response to entry into the site at various locations in the site. In these examples, the entry may begin at the home page or elsewhere in the site in response to a search for content using a search engine.

In FIG. 6A, nodes 602–648 are illustrated in site map 600. Each of these nodes represents a page in the site and may include identification information, such as a name of the page or an iconic representation of the content located in the page. In FIG. 6A, no pages have been visited by the user at this point.

In FIG. 6B, the user has visited one or more pages in the site. Site map 600 has been modified in FIG. 6B to identify visited pages and/or pages that are of interest in response to the user visiting one or more pages in the site. Based on the pages visited by the user, pages of interest to the user may be identified in site map 600. In this example, these pages are identified with an icon representing a page, such as that shown for node 606. Pages that have been visited or that are not believed to be of interest to the user are represented by an "X", such as node 612. In FIG. 6C, site map 600 again changes in response to the user visiting additional pages within the site.

Of course, different indicators may be used to identify sites that have been visited, as well as sites that are of interest to the user. For example, different colors may be used to distinguish between visited and unvisited sites, as well as sites that are of interest to the user. Further, if a user enters the site via a search engine, often times the entry is at a point other than the entry or home page. In such a situation, site map 600 may be used to represent what pages have been visited by the user, as well as other pages that have not been seen, but should be seen based on the selection of pages by the user in the site.

The illustration of site map 600 is not intended as a limitation to the manner in which a site map may be generated and presented to the user. Other types of icons or bit maps representing the nodes for the pages may be used. Also, the representation need not be in a tree structure as in these examples. Further, site map 600 may selectively include only portions of the pages located in the site based on the information gathered during the user's visit. This information may be gathered using different mechanisms. For example, a cookie stored at the client may be used to help in tracking pages visited by the user. Alternatively, a tag may be added to the page sent to the user containing the information. This information is retrieved when the user requests a site map.

Further, the connections between the nodes representing the pages need not be connections based on actual links between pages. Instead, these connections may be logical connections, guiding the user to a series of paths containing pages that are believed to be of interest to the user based on user interaction at the site. This interaction may take many forms, such as, for example, pages visited or retrieved by the user, the order in which pages are visited, and statistical information gathered about the user by a site. In this manner, the site map may be used as a guide by the user to identify an order in which pages should be retrieved.

Figure 7:
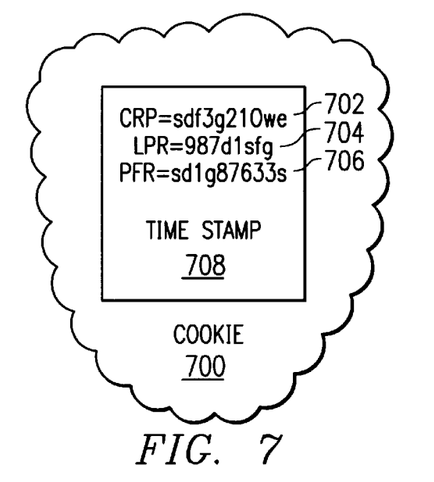
FIG. 7 is a diagram of a cookie in accordance with a preferred embodiment of the present invention.

With reference now to FIG. 7, a diagram of a cookie is depicted in accordance with a preferred embodiment of the present invention. Cookie 700 includes a current page request (CPR), a last page request (LPR) 704, a probable future request (PFR) 706, and a time stamp 708. When the user requests a site map, this information may be used to generate the site map. Alternatively, a tag may be used to provide information in generating a site map.

Figure 8:
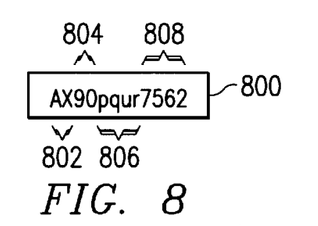
FIG. 8 is a diagram of a tag in accordance with a preferred embodiment of the present invention.

Turning next to FIG. 8, a diagram of a tag is depicted in accordance with a preferred embodiment of the present invention. Tag 800 is an example of a site map tag that is embedded in a Web page sent to the user. When the user requests a site map, the information in tag 800 is returned to the server for use in generating a site map. In this example, section 802 contains characters used to represent the current version of the site and the tracking policies for the site. Section 804, in this example, is a two digit code used to identify the current user's previous interaction with the site. This code is used to reference information stored in a database at the server. Section 806 contains an identification of the current site map. Section 808 in tag 800 indicates the user's current interaction with the site, as well as information for use in creating a new site map.

Figure 9:
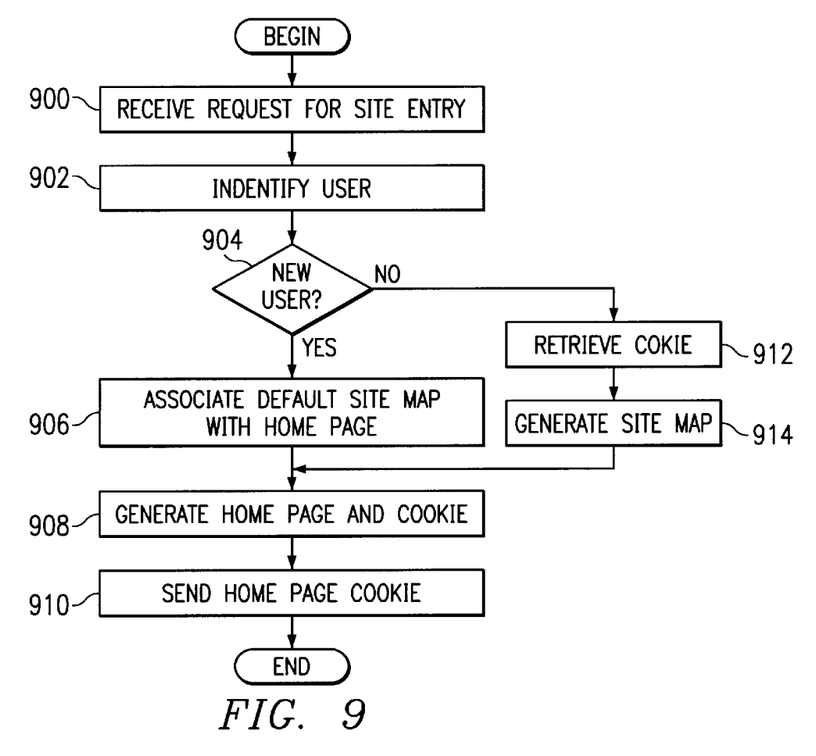
FIG. 9 is a flowchart of a process for generating a site map in accordance with a preferred embodiment of the present invention.

With reference now to FIG. 9, a flowchart of a process for generating a site map is depicted in accordance with a preferred embodiment of the present invention. This process is used when a user first enters a site. The process begins by receiving a request for entry into the site (step 900). The user is then identified (step 902). This identification may be made using a registration process or information in the request received from the user. Session information is stored for the user as part of step 902.

A determination is made as to whether the user is a new user to the site (step 904). This determination may be made in a number of different ways. For example, the determination may be made by seeing whether a cookie is present at the client machine identifying the user as a previous visitor or by checking a database. If the user is a new user, then a default site map is associated with the user (step 906). A home page and a cookie are generated (step 908). The home page and the cookie are sent to the user (step 910) with the process terminating thereafter.

With reference again to step 904, if the user is not a new user, a cookie for the user is retrieved (step 912). A site map is then generated for the user using information in the cookie (step 914) with the process then proceeding to step 908 as described above. In this example, site map information is stored in a cookie and retrieved to generate a site map for the user. Alternatively, the information may be placed in a tag embedded in the page returned to the user.

Figure 10:
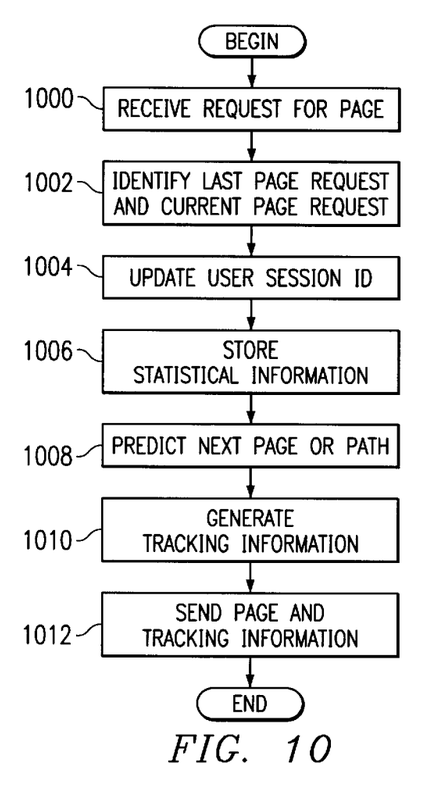
FIG. 10 is a flowchart of a process for tracking user information in accordance with a preferred embodiment of the present invention.

With reference now to FIG. 10, a flowchart of a process for tracking user information is depicted in accordance with a preferred embodiment of the present invention. The process in FIG. 10 is used to track information for use in generating site maps during a visit by a user to the site.

The process begins by receiving a request for a page (step 1000). Next, the last page request and the current page request are identified (step 1002). The user session ID is updated (step 1004). Statistical information is then stored (step 1006). This statistical information includes the last page request and the current page request. This information also may include, for example, an identification of when requests were made and the number of pages requested by the user.

Next, a next page or path is predicted based on the pages visited by the user (step 1008). Tracking information is then generated (step 1010). This tracking information may be placed in a cookie sent to the user or in a tag placed in the page to be returned to the user. The page and the tracking information are then returned to the user (step 1012) with the process terminating thereafter.

Figure 11:
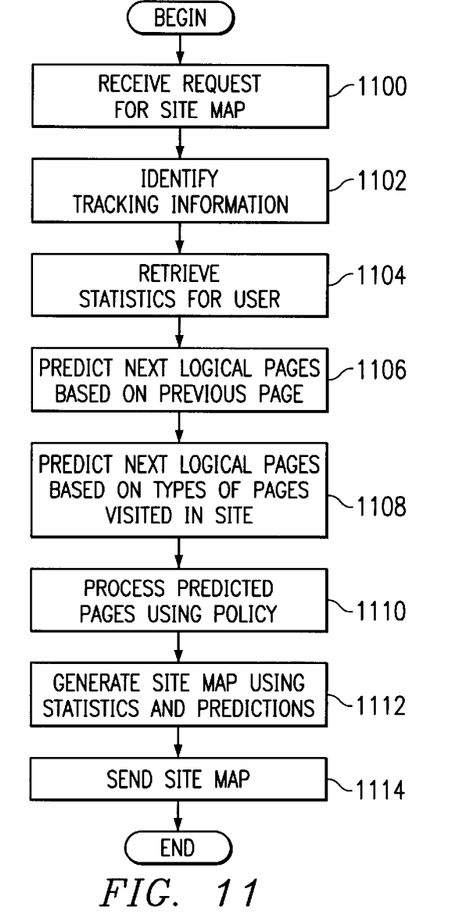
FIG. 11 is a flowchart of a process for generating a site map in accordance with a preferred embodiment of the present invention.

With reference next to FIG. 11, a flowchart of a process for generating a site map is depicted in accordance with a preferred embodiment of the present invention. The process begins by receiving a request for a site map (step 1100). Tracking information for the user is then identified (step 1102), and statistics are retrieved for the user (step 1104). This information may be identified and retrieved from a cookie located at the client machine from which the user makes the request or through a tag embedded in the page sent to the user. Alternatively, some of the information may be stored at the server with the information in the cookie or tag being used to reference this information.

The logical pages that should be visited or retrieved by the user are predicted based on the previous page or pages visited by the user (step 1106). Logical pages are also predicted based on the types of pages visited at the site (step 1108). These pages may be predicted using a variety of mechanisms. For example, the pages may be identified or categorized based on the content or key words. This information may be stored in a database in the server. When pages are selected by a user, the key words or categories for the pages may be used to find related pages for use in generating a site map. In addition, a selected page visited by a user may be used as an index into a database for one or more pages that are related or designated as being important to visit in response to the selected page being visited by a user.

Then, these predicted pages are processed using the site policy (step 1110). This policy may be used as a filter to show only certain types of users certain types of information. For example, different pages may be shown to users based on whether the user is accessing the site as an internal or intranet user or as an external or Internet user. The pages presented also may be based on other information, such as the age of the user or the occupation of the user. The selection of pages also may be based on relevance rankings generated by pages already visited by the user. These rankings may be generated, for example, based on key words on visited pages and ranking pages in the Web site based on the relevance of the pages to the visited pages.

A site map is then generated using the statistics and the pages identified after processing the predicted pages using the site policy (step 1112). The statistics in these examples include identifying pages visited and unvisited by the user. The site map is then sent to the user (step 1114) with the process terminating thereafter.

Therefore, the present invention provides an improved method, apparatus, and computer implemented instructions for creating and displaying user specific and site specific guidance and navigation information. The mechanism of the present invention generates a site map based on the user's perception of the site or the logical connection between the type of pages being viewed by the user and the types of content found in the pages in the site. The display of pages represent the type of information that is predicted to be desired by the user, not merely a representation of a page and its connection to another page. The site map illustrated in these examples are created to be unique to a particular user's visit to a site.

The tracking of the progress of a user within a site is accomplished in these examples by using tags added to the pages or by placing the information in a cookie. Using this information, the mechanism of the present invention predicts the information that a user may wish to see based on the content of the pages visited by the user. This prediction also may be made using other factors, such as, for example, an order in which the pages are visited or the time during which a page is visited. Further, a policy may be implemented to present selected pages in a site map. These policies will vary depending on the implementation for a particular site. The policies may be based on the site purpose, audience, and audience interaction.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

We claim:

1. A method in a data processing system for receiving navigation information for a site, the method comprising the data processing system implemented steps of:
   requesting content from the site;
   receiving the content and navigational information used to identify suggested content; and
   displaying the suggested content for optional selection by a user, wherein the suggested content is identified using the navigational information, wherein the content is a Web page and wherein the navigational information used to identify suggested content is located in a tag in the Web page, wherein the tag includes navigational information identifying a last requested Web page and a currently requested Web page.

2. The method of claim 1, further comprising:
   sending a request for the suggested content from the site, wherein the request includes the tag.

3. The method of claim 1, wherein the content is a Web page.

4. The method of claim 1, wherein the suggested content is a set of Web pages.

5. The method of claim 1, wherein the site is located on a web server.

6. A method in a data processing system for receiving navigation information for a site, the method comprising the data processing system implemented steps of:
   requesting content by a site;
   receiving the content and information used to identify suggested content; and
   displaying suggested content, wherein the suggested content is identified using the information, wherein the step of displaying suggested content comprises displaying a site map containing the suggested content such that the site map dynamically changes as different content is requested by the site.

7. The method of claim 6, wherein the requested content is a Web page and wherein the information used to identify suggested content is located in a tag in the Web page.

8. The method of claim 7 further comprising:
   sending a request for the suggested content from the site, wherein the request includes the tag.

9. The method of claim 7, wherein the tag includes navigational information identifying a last requested Web page and a currently requested Web page.

10. The method of claim 6, wherein the content is a Web page.

11. The method of claim 6, wherein the suggested content is a set of Web pages.

12. The method of claim 6, wherein the content is a Web page and wherein the information used to identify suggested content is located in a cookie sent to the data processing system.

13. The method of claim 12 further comprising:
    sending a request for the suggested content from the site, wherein the request includes the cookie.

14. The method of claim 12, wherein the cookie includes navigational information identifying a last requested Web page and a currently requested Web page.

15. The method of claim 6, wherein the site is located on a web server.

16. A method in a data processing system for generating suggested content for a site, the method comprising the data processing system implemented steps of:
    receiving a request for content for the site from a client, wherein the content is requested content;
    sending the requested content to the client, wherein the requested content includes information identifying user movement within the site; and
    generating suggested content using the information, wherein the requested content is a Web page and wherein the information used to identify suggested content is located in a tag in die Web page, wherein the tag includes information identifying a last requested Web page and a currently requested Web page.

17. The method of claim 16 further comprising:
    receiving a request from the client for the suggested content from the client, wherein the request includes information from the tag.

18. The method of claim 16, wherein the content is a Web page.

19. The method of claim 16, wherein the suggested content is a set of Web pages.

20. The method of claim 16, wherein the suggested content changes as additional requests for content are made from the site.

21. The method of claim 16 further comprising:
sending the suggested content to the client in response to a request for the suggested content.

22. The method of claim 16 further comprising:
storing an identification of the requested content in response to receiving the request, wherein the identification is used to generate the suggested content.

23. The method of claim 16, wherein the step of generating the content using the information comprises:
identifying content using the information to form identified content; and
selecting the content using a policy.

24. A data processing system for receiving navigation information for a user site, the data processing system comprising:
requesting means for requesting content;
receiving means for receiving the content and information used to identify suggested content at the user site; and
displaying means for displaying suggested content at the user site that may optionally be viewed in full by a user, wherein the suggested content is identified using the information, wherein the content is a Web page and wherein the information used to identify suggested content is located in a tap in the Web page, wherein the tag includes information identifying a last requested Web page and a currently requested Web page.

25. The data processing system of claim 24 further comprising:
sending means for sending a request for the suggested content from the site, wherein the request includes the tag.

26. The data processing system of claim 24, wherein the content is a Web page.

27. The data processing system of claim 24, wherein the suggested content is a set of Web pages.

28. The data processing system of claim 24, wherein the site is located on a web server.

29. A data processing system for receiving navigation information for a site, the data processing system comprising:
requesting means for requesting content;
receiving means for receiving the content and information used to identify suggested content; and
displaying means for displaying suggested content, wherein the suggested content is identified using the information, wherein the means of displaying suggested content comprises displaying means for displaying a site map containing the suggested content such that the site map dynamically changes as different content is requested.

30. The data processing system of claim 29, wherein the requested content is a Web page and wherein the information used to identify suggested content is located in a tag in the Web page.

31. The data processing system of claim 30 further comprising:
sending means for sending a request for the suggested content from the site, wherein the request includes the tag.

32. The data processing system of claim 30, wherein the tag includes navigational information identifying a last requested Web page and a currently requested Web page.

33. The data processing system of claim 29, wherein the content is a Web page.

34. The data processing system of claim 29, wherein the suggested content is a set of Web pages.

35. The data processing system of claim 29, wherein the content is a Web page and wherein the information used to identify suggested content is located in a cookie sent to the data processing system.

36. The data processing system of claim 35 further comprising:
sending means for sending a request for the suggested content from the site, wherein the request includes the cookie.

37. The data processing system of claim 35, wherein the cookie includes navigational information identifying a last requested Web page and a currently requested Web page.

38. The data processing system of claim 29, wherein the site is located on a web server.

39. A data processing system for generating suggested content for a site, the data processing system comprising:
receiving means for receiving a request for content for the site from a client, wherein the content is requested content;
sending means for sending the requested content to the client, wherein the requested content includes information identifying user movement within the site; and
generating means for generating suggested content using the information, wherein the requested content is a Web page and wherein the information used to identify suggested content is located in a tag in the Web page, wherein the tag includes information identifying a last requested Web page and a currently requested Web page.

40. The data processing system of claim 39 further comprising:
receiving means for receiving a request from the client for the suggested content from the client, wherein the request includes information from the tag.

41. The data processing system of claim 39, wherein the content is a Web page.

42. The data processing system of claim 39, wherein the suggested content is a set of Web pages.

43. The data processing system of claim 39, wherein the suggested content changes as additional requests for content are made from the site.

44. The data processing system of claim 39, wherein the sending means is a first sending means, and further comprises:
a second sending means for sending the suggested content to the client in response to a request for the suggested content.

45. The data processing system of claim 39 further comprising:
storing means for storing an identification of the requested content in response to receiving the request, wherein the identification is used to generate the suggested content.

46. The method of claim 39, wherein the step of generating means comprises:
identifying means for identifying content using the information to form identified content; and
selecting means for selecting the content using a policy.

* * * * *

UNITED STATES PATENT AND TRADEMARK OFFICE
CERTIFICATE OF CORRECTION

PATENT NO. : 6,757,724 B1
DATED : June 29, 2004
INVENTOR(S) : Fields et al.

It is certified that error appears in the above-identified patent and that said Letters Patent is hereby corrected as shown below:

<u>Title page,</u>
Item [74], *Attorney, Agent, or Firm*, delete "Leslie A. Vanleeuwen" and insert -- Leslie A. VanLeeuwen --.

<u>Column 10,</u>
Line 53, after "tag in" delete "die" and insert -- the --.

<u>Column 11,</u>
Line 24, after "located in a" delete "tap" and insert -- tag --.

<u>Column 12,</u>
Line 58, after "46. The" delete "method" and insert -- data processing system --.

Signed and Sealed this

Tenth Day of January, 2006

JON W. DUDAS
*Director of the United States Patent and Trademark Office*